(12) United States Patent
Pathak et al.

(10) Patent No.: US 10,176,011 B2
(45) Date of Patent: Jan. 8, 2019

(54) AUTOMATICALLY GENERATING AND EXECUTING A SERVICE OPERATION IMPLEMENTATION FOR EXECUTING A TASK

(71) Applicant: Tata Consultancy Services Limited, Mumbai (IN)

(72) Inventors: Amrish Shashikant Pathak, Pune (IN); Nikita Aggarwal, Pune (IN); Humakausar Saudagar, Pune (IN); Harrick Mayank Vin, Pune (IN); Rahul Ramesh Kelkar, Pune (IN); Adwait Inamdar, Pune (IN); Veena Deshmukh, Pune (IN); Sudha Veera Venkata Lakshmi Kancharla, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 103 days.

(21) Appl. No.: 15/178,160

(22) Filed: Jun. 9, 2016

(65) Prior Publication Data
US 2016/0364262 A1    Dec. 15, 2016

(30) Foreign Application Priority Data

Jun. 10, 2015    (IN) .......................... 2232/MUM/2015

(51) Int. Cl.
*G06F 9/46*        (2006.01)
*G06F 9/455*     (2018.01)
(Continued)

(52) U.S. Cl.
CPC .......... *G06F 9/48* (2013.01); *G06F 17/30604* (2013.01); *G06N 5/00* (2013.01); *H04L 67/16* (2013.01)

(58) Field of Classification Search
None
See application file for complete search history.

(56) References Cited

U.S. PATENT DOCUMENTS 7,437,703 B2    10/2008    Wu
7,472,103 B1 *  12/2008    Yang .......................... G06F 8/34
                                                                      706/52
(Continued)

OTHER PUBLICATIONS

Lee, C., et al., "A Service Pattern Model and its Instantiation Using Rule-Based Reasoning", Department of Information Management, National Sun Yat-sen University, pp. 1-75, (2012).

*Primary Examiner* — Bradley A Teets
(74) *Attorney, Agent, or Firm* — Finnegan, Henderson, Farabow, Garrett & Dunner LLP

(57) ABSTRACT

System and method for automatically generating and executing service operation, implementation for executing a task is disclosed. Task information and Entity relationship model associated with task is processed to identify part of the Entity Relationship Model matching with the task. Service operation template associated with the task is identified based on task information; and part of the Entity relationship model and service operation template is processed dynamically to generate and execute service operation implementation for executing the task. In another aspect, a part of an Entity relationship instance model associated with the task is identified dynamically based on the part of the Entity Relationship Model matching with the task and the task information; and part of the Entity relationship Instance model and service operation template processed dynamically, to generate and execute the service operation implementation for executing the task.

13 Claims, 15 Drawing Sheets

(51) Int. Cl.
　　　*G06F 9/48*　　　(2006.01)
　　　*G06F 17/30*　　(2006.01)
　　　*H04L 29/08*　　(2006.01)
　　　*G06N 5/00*　　　(2006.01)

(56) References Cited

U.S. PATENT DOCUMENTS

| | | | |
|---|---|---|---|
| 7,698,293 B2 | 4/2010 | Kristoffersen et al. | |
| 2005/0010550 A1* | 1/2005 | Potter | G06F 17/30592 |
| 2008/0091633 A1* | 4/2008 | Rappaport | G06N 5/022 |
| | | | 706/50 |
| 2010/0280977 A1* | 11/2010 | Dybala | G06Q 10/06 |
| | | | 706/11 |
| 2012/0124553 A1* | 5/2012 | Eschenroeder | G06F 8/71 |
| | | | 717/121 |
| 2012/0137304 A1* | 5/2012 | Boullery | G06Q 10/06 |
| | | | 719/313 |
| 2014/0033167 A1* | 1/2014 | Solovey | G06F 8/35 |
| | | | 717/104 |
| 2014/0237443 A1* | 8/2014 | Pana | G06F 8/20 |
| | | | 717/105 |
| 2014/0278725 A1* | 9/2014 | Malko | G06Q 10/0633 |
| | | | 705/7.27 |
| 2015/0106322 A1* | 4/2015 | Pathak | G06N 5/025 |
| | | | 706/47 |
| 2015/0379394 A1* | 12/2015 | Thaler | G06N 3/063 |
| | | | 706/20 |
| 2016/0055233 A1* | 2/2016 | Wang | G06F 17/30604 |
| | | | 707/756 |

* cited by examiner

| Service Operation Template/Pattern | Entity Relationship Model (Technology model) | Service Operation (Create User) |
|---|---|---|
| Parameters Check | (OS) Has → User<br>Hostname / Name<br>Version / Password | ((Name exists) && (Password exists) && (Hostname exists)) |
| Parent Check | OS (User)<br>Hostname Has → Name<br>Version Password | CheckOS (${Hostname}) |
| Self Check | OS (User)<br>Hostname Has → Name<br>Version Password | CheckUser(${Name}, ${Password}, ${Hostname}) |
| Create Entity | OS (User)<br>Hostname Has → Name<br>Version Password | CreateUser(${Name}, ${Password}) |
| Self Check | OS (User)<br>Hostname Has → Name<br>Version Password | CheckUser(${Name}, ${Password}, ${Hostname}) |

AUTOMATICALLY GENERATING AND EXECUTING A SERVICE OPERATION IMPLEMENTATION FOR EXECUTING A TASK

PRIORITY CLAIM

This U.S. patent application claims priority under 35 U.S.C. § 119 to: India Provisional Patent Application No. 2232/MUM/2015, filed on Jun. 10, 2015. The entire contents of the aforementioned application are incorporated herein by reference.

TECHNICAL FIELD

The embodiments described herein generally relate to knowledge modeling and execution in service industries, and more particularly to system and method for generating service operation implementation.

BACKGROUND

IT service management is widely practiced in organizations and administrations, wherein enormous amount of knowledge is utilized for analysis and resolution of problems arising in routine service and support work. The service and support industries are executing voluminous service operations on day-to-day basis. The service operations enable efficient and effective provision of the IT services across the organization. The service operations comprises monitoring services, resolving issues, fulfilling customer requests and carrying out various operational tasks. The service operations are associated with different technologies and involve use of variety of technical tools and resources.

Conventionally, the knowledge used for execution of service operations is mostly available in the software systems in stored forms or available with human resources in tacit form. This knowledge available with the human resources and software systems needs to be converted into structured, complete, executable and reusable form. Knowledge capturing through crowd sourcing exposes to a potential risk of non-uniformity in the knowledge captured for similar technologies. The non-uniformity of the knowledge so captured further results in difficulty in abstracting the knowledge for similar technologies.

Further, the knowledge captured by various means comprises variety of service catalogues containing service operations, wherein currently the service operations are authored manually. The service operations authored manually are inherently prone to many drawbacks such as incompleteness, inaccuracy, and inconsistency. Analogous service operations, authored manually, may have non-similar implementations. Further, the service operations which are incomplete, and inaccurate, and inconsistent further mainly result in hampering system performance while execution. Further, manual authoring of service operations result in consuming heavy system cycle time while validating the service operations, hence costly to maintain. Further, population of manually authored service operations is a current method used for service operation implementations. Currently, the service operations implementations are authored manually and stored in the systems. The manual authoring and validation of such service operations consumes substantial system cycles and man hours. Further, major technical problem with such service operation implementation is that such service operation implementations could be incomplete wherein many times necessary steps are missing, or these service operations may be incorrect wherein wrong steps may be coded. Further, these service operation implementations may be inconsistent wherein similar service operations have non-similar implementations.

The technical problem associated with the manually authored service operations are explained in detail herein. For example, consider a hierarchy of infrastructure elements as OS→User. Then for 'Create User' Service Operation, correct implementation is: 1) Check OS 2) If OS exists, Check User, else Eject 3) If User does not exists, Create User, else Eject 4) If User is created successfully, Check User, else Eject 5) If User exists, Resolved, else Eject. But in manually authored service operations, it may be possible that any of the above steps or sub steps are missing. For instance pre check of user and all eject statements are skipped, i.e. the service operation may be written as—1) Check OS 2) If OS exists, Create User 3) If User is created successfully, Check User 4) If User exists, Resolved. Hence, this results in incomplete service operation.

Further, in another example, the service operation is 'Check OS'. The required service operation should be as followed: 1) If OS exists, Check User 2) If User does not exists, Create User 3) If User is created successfully, Check User 4) If User exists, Resolved. But, due to human mistake, the service operation may be written as: 1) Check OS 2) If OS exists, Check User 3) If User exists, Create User 4) If User is created successfully, Check User 5) If User does not exists, Resolved. Hence, manual authoring of service operation results in incorrect service operation.

Another major technical problem with the present art is storing of the manually authored service operation implementations which is consuming major memory space and maintenance of those stored service operations is time consuming and costly. Further, there is a hidden threat of security to the stored service operations that someone may steal, change or destroy the knowledge lying in the service operations when in stored form.

SUMMARY

Embodiments of the present disclosure present technological improvements as solutions to one or more of the above-mentioned technical problems recognized by the inventors in conventional systems. For example, in one embodiment, a method for automatically generating and executing a service operation implementation for executing a task is disclosed. The method comprises processing dynamically, by a hardware processor, task information associated with a task, and an Entity relationship model associated with the task to identify a part of the Entity Relationship Model matching with the task. The method further comprises identifying dynamically, by the hardware processor, a part of an Entity relationship instance model associated with the task based on the part of the Entity Relationship Model matching with the task and the task information. The method further comprises identifying dynamically, by the hardware processor, a service operation template associated with the task based on the task information; and processing dynamically, by the hardware processor, the part of the Entity relationship instance model and the service operation template to generate a service operation implementation for executing the task. The data required by the service operation implementation is fetched from the Entity Relationship instance model as and when necessary for executing the task.

In another embodiment, a system for automatically generating service operation implementation is disclosed. The system comprises a hardware processor; and a memory coupled to the hardware processor, wherein the hardware processor executes a plurality of modules stored in the memory. The plurality of modules comprises a pre-processing module and an implementation generator. The pre-processing module processes dynamically task information associated with a task and an Entity relationship model associated with the task to identify a part of the Entity Relationship Model matching with the task. Further, the pre-processing module identifies dynamically, a part of an Entity relationship instance model associated with the task based on the part of the Entity Relationship Model matching with the task and the task information. The system further dynamically identifies a service operation template associated with the task based on the task information. Further, the implementation generator processes dynamically the part of the Entity relationship instance model and the service operation template to generate a service operation implementation for executing the task.

In yet another embodiment, a non-transitory computer readable medium embodying a program executable by a hardware processor in a computing device for automatically generating and executing a service operation implementation for executing a task is disclosed. The program comprises a program code for processing dynamically task information associated with a task, and an Entity relationship model associated with the task to identify a part of the Entity Relationship Model matching with the task. The program further comprises a program code for identifying dynamically, a part of an Entity relationship instance model associated with the task based on the part of the Entity Relationship Model matching with the task and the task information. The program further comprises a program code for identifying dynamically a service operation template associated with the task based on the task information. The program further comprises a program code for processing dynamically the part of the Entity relationship instance model and the service operation template to generate a service operation implementation for executing the task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 15 shows Table 2 illustrating Mapping of service operation template with technology from Entity Relationship Model (Technology Model), in accordance with an exemplary embodiment of the present subject matter.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

According to an embodiment, a system and method for automatically generating and executing a service operation implementation for executing a task is disclosed. In another embodiment, the system and method for modelling a technology present in an Entity Relationship model (technology model), and defining the service operation template or service operation pattern on top of the technology model for generating the service operation implementations is disclosed.

In one aspect, a system and method for generating service operation implementation based on the service operation template is disclosed. In another aspect, the system and method for modelling of a technology in an Entity Relationship (ER) model as a technology model, and defining a service operation template (pattern) on top of the technology model for generating a service operation implementation for executing a task is disclosed.

Still, in another aspect, the system and method for populating the service operation template (pattern) providing an efficient and faster way of generating the service operation implementation, as compared to hand coding of the service operation implementation is disclosed. The service operation implementation so generated based on the service operation template is standardized, consistent, and complete across different technologies.

The system and method enables automated knowledge generation to address issues in the current art such as incompleteness, incorrectness, inconsistency in the automated knowledge generation. Further, the system and method enables improved automated knowledge generation, and so generated knowledge is very efficient.

Figure 1:
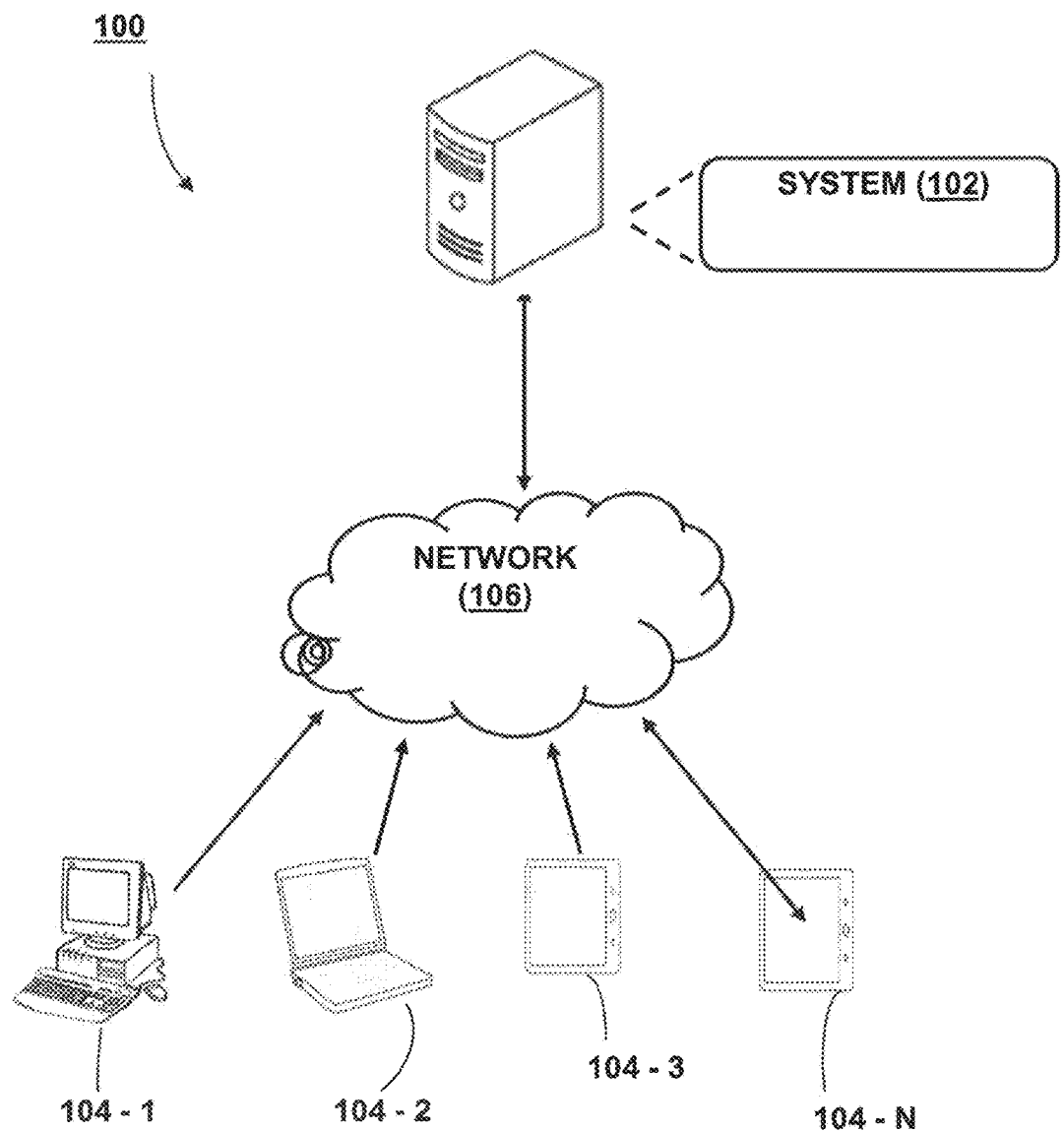
FIG. 1 illustrates a network implementation of a system for automatically generating and executing a service operation implementation for executing a task, in accordance with some embodiments of the present disclosure.
Figure 2:
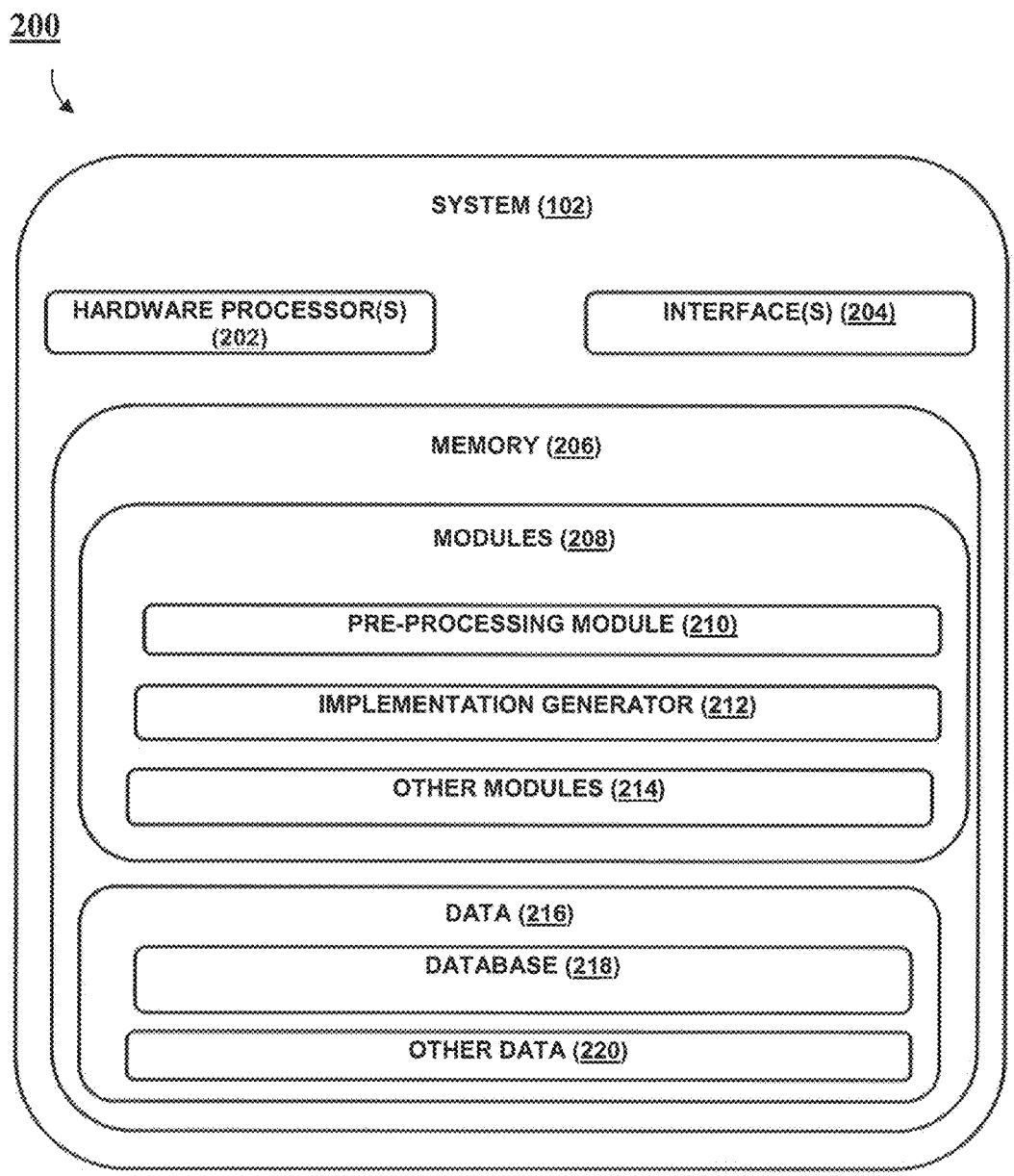
FIG. 2 illustrates the system for automatically generating and executing the service operation implementation for executing the task, in accordance with some embodiments of the present disclosure.

According to an embodiment, referring to FIG. 1 and FIG. 2, the system and method for automatically generating and executing the service operation implementation for executing a task is described. There are shown preferred embodiments and these embodiments are described in the context of the following exemplary system and/or method.

It is however to be understood that the scope of protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

While aspects of described system and method may be implemented in any number of different computing systems, environments, and/or configurations, the embodiments are described in the context of the following exemplary system.

Referring to FIG. 1, a network implementation 100 of a system 102 for automatically generating and executing a service operation implementation for executing a task is illustrated, in accordance with an embodiment of the present subject matter. Although the present subject matter is explained considering that the system 102 is implemented as a computing system, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 2, the system 102 is illustrated in accordance with an embodiment of the present subject matter. In one embodiment, the system 102 may include at least one hardware processor 202, an input/output (I/O) interface 204, and a memory 206. The at least one hardware processor 202 may be implemented as one or more microprocessors, microcomputers, microcontrollers, digital signal processors, central processing units, state machines, logic circuitries, and/or any devices that manipulate signals based on operational instructions. Among other capabilities, the at least one hardware processor 202 is configured to fetch and execute computer-readable instructions or modules 208 stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 222.

The modules 208 include routines, programs, programmed instructions, objects, components, data structures, etc., which perform particular tasks or implement particular abstract data types. In one implementation, the modules 208 may include a pre-processing module 210, an implementation generator 212, and other modules 214. The other modules 214 may include programs or coded instructions that supplement applications and functions of the system 102.

The data 216, amongst other things, serves as a repository for storing data processed, received, and generated by one or more of the modules 208. The data 216 may also include rules and exception database 218, and other data 220.

Referring now to FIG. 2, working of the system 102 for automatically generating and executing the service operation implementation for executing the task is explained. The present disclosure relates to automatically generating and executing the service operation implementation by using a service operation template. More particularly, a part of an Entity relationship instance model and a service operation template associated with the task is dynamically processed to generate a service operation implementation for executing the task. The identification of the part of the Entity relationship instance model and the service operation template is performed in real time to dynamically execute the task. The task is a computer implemented task associated with one or more computer implemented services.

In conventional art, the service operations are manually authored, however the manually authored service operations are more complex and these service operations need to be stored, compiled and translated or interpreted to convert these service operations into executable form. Further, storing these service operations could also attract other requirements for protecting the intellectual property like encrypting, hiding, and the like. So generated service operations need to be validated again for correctness, completeness and consistency before application. Conventionally, service operations for similar tasks such as create user, create file, create group, different service operations are generated which creates redundancy of knowledge. Thus manually authoring service operations results in additional use of system cycles and memory space. In order to solve these technical problems, the system and method for automatically generating and executing a service operation implementation for executing a task is disclosed.

According to an embodiment, in order to generate and execute the service operation implementation, the pre-processing module 210 receives task information associated with a task, and an Entity relationship model associated with the task. The task is a computer implemented task for providing one or more computer implemented services. The computer implemented services comprises but not limited to monitoring services, resolving issues, fulfilling customer requests and carrying out various operational tasks. The computer implemented services may be associated with a variety of technology resources, technology tools and different software applications. The computer implemented services may be associated with variety of operating systems, database management systems or various technical tools. The computer implemented service may be any service known to a person skilled in the art. The computer implemented services further comprises a plurality of service operations. The service operations are the tasks associated with the computer implemented services. The service operation may further comprise one or more service operations associated with the task, and wherein the one or more service operations are further associated with one or more tasks. The service operation comprises one or more sub-tasks or one or more sub-steps of the task. The Entity relationship (ER) model is based on at least one technology, or at least one resource, or at least one software application. The ER model may be associated with various domains e.g. Telecom, Retail, Manufacturing, Finance, Pharmaceuticals, Automotive, HealthCare, Life Sciences and so on. Each domain has their own technologies or Resources like Order to Activation, Pharmacovigilance, and Procure to Pay, Account Administrations, and so on.

The task information comprises at least one of a type of the task, a name of the task, summary of the task, parameters to execute the task, and key element associated with the task. The key element is an entity or an attribute or a condition or an association between entities or between attributes in the Entity Relationship Model. Example of tasks are create user, create a file, create a group, set operating system (OS) memory size, and the like.

By way of an example for "create user" task, viz. to create a service operation implementation for "Create User", the pre-processing module receives an ER model, and Task Information. The ER model may also be termed as "Meta-Model" or "Infra Model". Further, Task Information comprises a Task Name as "Create User", Task Parameters as OS_Name, OS_DomainName, OS_HostLoginName, User_Name, User_Password, Task Summary as Create User and Key Element as User.

Figure 3:
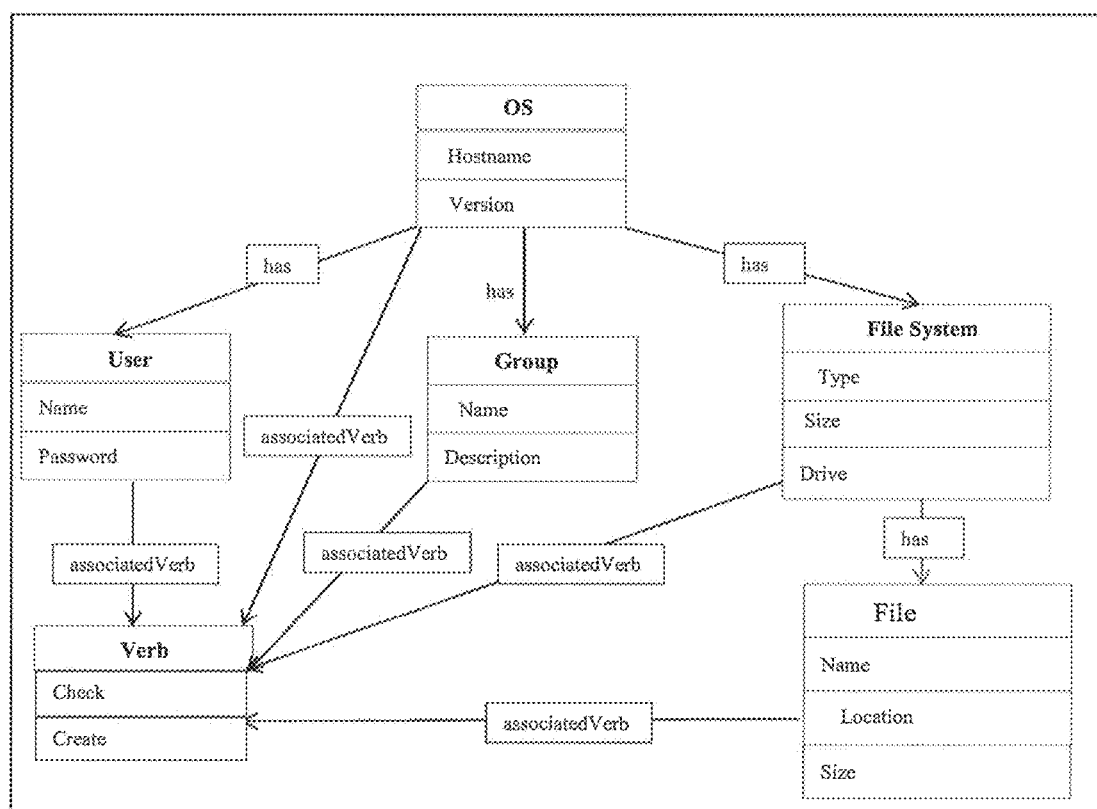
FIG. 3 illustrates an entity relationship model for 'create user' task in accordance with some embodiments of the present disclosure.

After receiving the task information and the ER model, the pre-processing module 210 processes the task information and the Entity relationship model to identify a part of the Entity Relationship Model matching with the task. The matching part of the Entity Relationship (ER) Model is respective branch of the ER model matching with the task. The Entity Relationship model stores knowledge/information of the technology for which implementations are to be generated. The Entity Relationship Model comprises entities, attributes of the entities and relationships between the entities, property tags, verbs, conditions and associations between the plurality of entities or plurality of attributes. FIG. 3 illustrates an entity relationship model in accordance with an exemplary embodiment of the present disclosure. In one example, the ER model are coded in Json™. The ER model can also be coded in xml or similar technologies known to a person skilled in the art.

Referring to FIG. 3, the ER Model shows OS (Operating System) as main entity. Further OS contains entities such as a User, a Group and a File System. The File System entity contains a sub-entity—File. Hostname and Version are attributes of OS and Hostname is the key attribute. Name and Password are attributes of User and Name is the key attribute of the User. Name and Description are the attributes of Group and a key attribute is Name. Type, Size and Drive are the attributes of File System and Drive is the key attribute. Name, Location and Size are the attributes of File. Name and Location are the key attributes of File. Verbs are operations to be performed on the entities. Hence, in one example, Check and Create are operations (verbs) which can be performed on OS, User, Group, File System and the File. The operations performed on the entities are termed as service operations.

After identifying the part of the Entity relationship model, the pre-processing module 210 dynamically identifies a service operation template associated with the task based on the task information. The service operation template is described below. After identifying the part of the ER model, the implementation generator 212 dynamically processes the part of the Entity relationship model and the service operation template so identified to generate a service operation implementation for executing the task. The implementation generator 212 dynamically generates implementation for one or more sub-steps of the service operation, and simultaneously executes the implementation for the one or more sub-steps for executing the service operation implementation. The dynamic generation and execution of the implementation for the one or more sub-steps of the service operation depends on one or more pre-conditions mentioned in the service operation template. The execution of the one or more sub-steps of the service operation implementation depends on result of verification of the pre-condition. The implementation generator 212 generates and simultaneously executes the one or more sub-steps or one or more sub-tasks based on the result of verification of the pre-condition as "true" or "false". Thus the system saves on generation and execution cycles of implementation of the service operation sub-steps/sub-tasks when it is not required or when the output of pre-condition verification is false/true. The system executes the implementation for one or more sub-steps of the service operation based on the logic mentioned in the service operation template.

Similar service operations to be performed across various technologies may follow same service operation template. For example, 'create' task for various entities such as User, File, and Group has a common pattern/common service operation template across various technologies. By way of an example, a "Create User" service operation -CreateUser_SOP (Name, Password, Hostname) is shown below in Table 1.

Referring to the service operation shown in Table 1, it is observed that there exists a pattern or template in above explained 'create' task which can generate a service operation for a verb 'Create'. Above described service operation template for "Create" verb is depicted by a flow Chart defined in FIG. 4. As shown in the flow chart, for create entity (user/file/group) task, in first step, parameters are checked for availability. If no parameters present, system ejects or terminates with an error message displayed. In next step, parent is checked. If parent does not present, system ejects. If parent is present, entity check is done, called as 'self-check'. Further, if entity is already present, system ejects. If entity is not present, then entity is created. After creation of the entity, again entity is checked for creation/presence. If entity is present, indicating successful creation of the entity. Herein for example, entity is a user. The service operation template (pattern) for "create user", devised in FIG. 4, may be applied to any entity such as user/file/group to generate implementations for the create user/file/group service operations resulting from the verb 'create'. For example, applying (mapping) of the service operation template to the User entity shown in Entity Relationship model (Technology Model) to obtain the implementation of the service operation is shown in Table 2 shown in FIG. 15. Table 2 is shown in FIG. 15 which illustrates Mapping of service operation template with technology from Entity Relationship Model (Technology Model).

The mapping of the service operation template with matching part of the Entity Relationship Model (Technology Model) generates implementation of the service operation. The implementation of the service operation CreateUser_SOP (UserName, UserPassword, OSHostname) so generated by mapping of the service operation template with ER Model (from Table 2) is provided in Table 3 below.

TABLE 1

| CreateUser_SOP (Name, Password, Hostname) | | |
|---|---|---|
| PREDICATE | ACTION | REMARKS |
| 1. ((Name exists) && (Password exists) && (Hostname exists)) | (var11_return, var11_output ) = CheckOS(${Hostname}) | Is OS accessible |
| 2. ((var11_return != 0)) | ( Eject ) | No, then terminate |
| 3. ((var11_return = 0)) | (var1_return, var1_output ) = CheckUser(${Name } , ${ Password } , ${ Hostname }) | Yes, then check if user already exists |
| 4. ((var1_return = 0)) | ( Eject ) | Yes, then terminate |
| 5. ((var1_return != 0)) | (var2_return, var2_output ) = CreateUser(${Name } , ${ Password } ) | No, then create user |
| 6. ((var2_return != 0)) | (Eject) | User creation failed |
| 7. ((var2_return = 0)) | (var3_return, var3_output ) = CheckUser(${Name } , ${ Password } , ${ Hostname }) | Post Check |
| 8. ((var3_return != 0)) | ( Eject ) | User creation failed, terminate |
| 9. ((var3_return = 0)) | ( Resolved) | User creation succeeded, resolve |

TABLE 3

Implementation of Service Operation CreateUser_SOP (UserName, UserPassword, OSHostname)

| # | PREDICATE | ACTION |
|---|---|---|
| 1. | ((Name exists) && (Password exists) && (Hostname exists)) | (var11_return, var11_output ) = CheckOS(${Hostname}) |
| 2. | ((var11_return != 0)) | ( Eject ) |
| 3. | ((var11_return = 0)) | (var1_return, var1_output ) = CheckUser(${Name }, ${ Password } , ${ Hostname }) |
| 4. | ((var1_return = 0)) | ( Eject ) |
| 5. | ((var1_return != 0)) | (var2_return, var2_output ) = CreateUser(${Name }, ${ Password } ) |
| 6. | ((var2_return != 0)) | (Eject) |
| 7. | ((var2_return = 0)) | (var3_return, var3_output ) = CheckUser(${Name }, ${ Password } , ${ Hostname }) |
| 8. | ((var3_return != 0)) | ( Eject ) |
| 9. | ((var3_return = 0)) | ( Resolved) |

Similarly, the service operation template shown above can be applied to other entities of the ER Model such as File, Group for the verb "Create". By mapping Create verb service operation template on Entity 'File', implementation for 'create file' service operation so obtained is shown below in Table 4.

TABLE 4

Implementation of the service operation: CreateFile_SOP (FileName, FileLocation, FileSize, FileSystemDrive, OSHostname)

| # | PREDICATE | ACTION |
|---|---|---|
| 1. | ((FileName exists) && ( FileLocation exists) && (FileSize exists) && (FileSystemDrive exists)&&(OSHostname exists)) | (var11_return, var11_output ) = CheckOS(${OSHostname}) |
| 2. | ((var11_return != 0)) | ( Eject ) |
| 3. | ((var11_return = 0)) | (var11_return,var11_output)= CheckFileSystem(${FileType),$(FileSize),$(FileSystem Drive),$(OSHostname)) |
| 4. | ((var11_return != 0)) | ( Eject ) |
| 5. | ((var11_return = 0)) | (var1_return, var1_output ) = CheckFile(${FileName} , ${ FileLocation } , ${FileSize} , $(FileSystemDrive) , ${ OSHostname }) |
| 6. | ((var1_return = 0)) | ( Eject ) |
| 7. | ((var1_return != 0)) | (var2_return, var2_output ) = CreateFile(${FileName} , ${ FileLocation} , ${FileSize}) |
| 8. | ((var2_return != 0)) | ( Eject ) |
| 9. | ((var2_return = 0)) | (var3_return, var3_output ) = CheckFile(${FileName } , ${ FileLocation } , ${FileSize} , ${FileSystemDrive} , ${OSHostname }) |
| 10. | ((var3_return != 0)) | ( Eject ) |
| 11. | ((var3_return = 0)) | ( Resolved) |

The implementations of the one or more service operations comprises a plurality of rules to execute the service operations, and the plurality of rules comprise predicate-action pairs as shown in Table 4. The predicate-action pairs further comprise pre-conditions and the one or more standard operators or the one or more service operations. In order to understand generation of the service operation implementation, following terms are explained. A service catalogue is a catalogue of service operations for managing a technology layer. The service catalogue contains service operational issues resolving incidents or fulfilling service/change requests. By way of an example, the service catalogues may be for example such as Oracle Management, Windows Management, Web Application Management, Pharmaceuticals management, Telecom management, Retail management, Banking management, Insurance management and the like. A Service Operation may be a composition of standard operators and/or one or more service operations in a workflow. By way of an example, the service operations may be 'Create an OS User', 'Create an OS Group', 'Add a User to a Group', 'Order to Activation', 'Pharmacovigilance', 'Procure to Pay' and the like. A Standard Operator may be an atomic function that represents one or more single actions of a technology. For example—Standard operators are used to Check User, to Create Group in OS and the like. Examples of Standard Operators are as listed here: CheckUser(username) having the implementation -cat/etc/passwd | grep ":${CheckUser:username}:" and DeleteUser (username) having the implementation-userdel ${DeleteUser:username}

Figure 5:
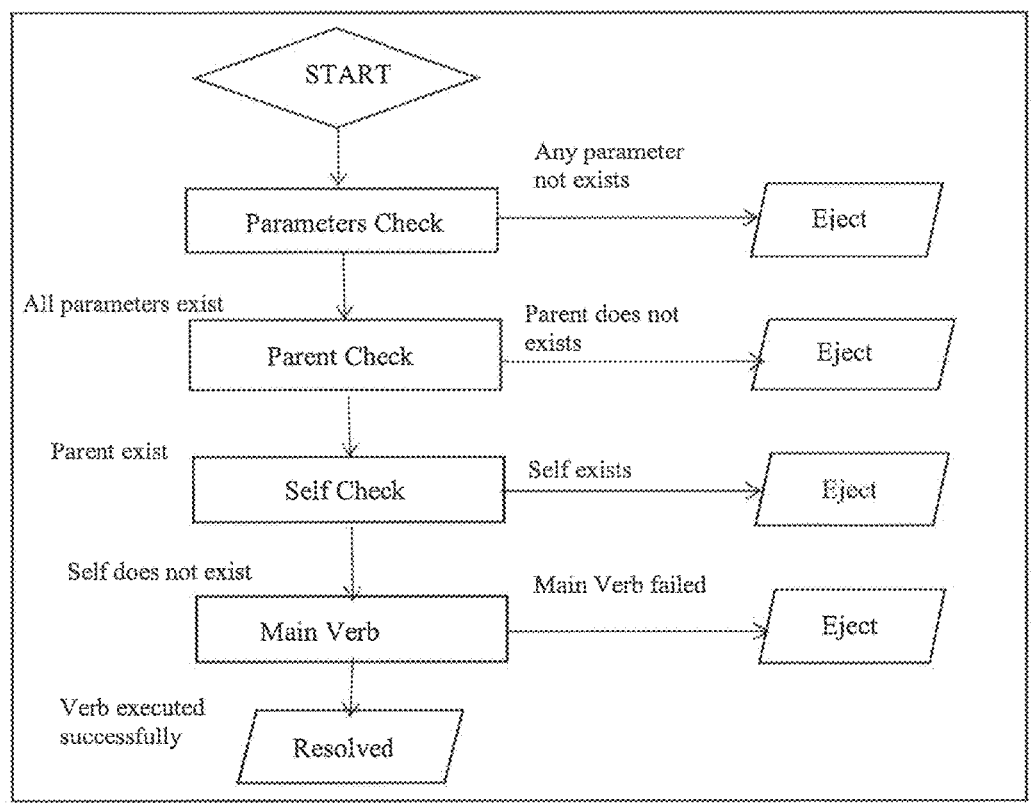
FIG. 5 illustrates a generalized service operation template in accordance with some embodiments of the present disclosure.
Figure 6:
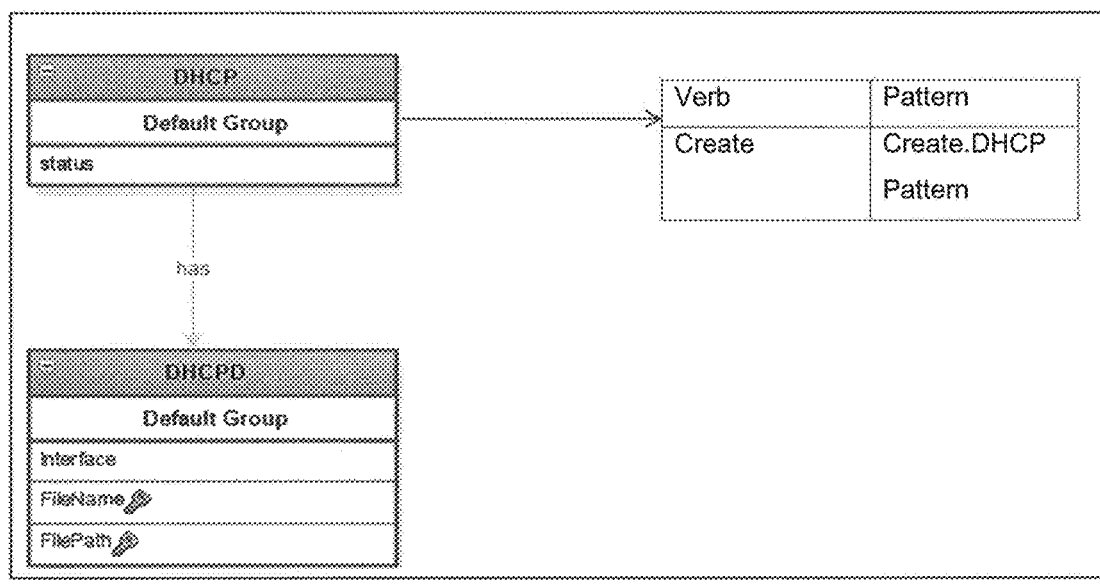
FIG. 6 illustrates association of create verb with DHCP and DHCPD in accordance with some embodiments of the present disclosure.

According to another embodiment of the present disclosure, referring to FIG. 5, a general service operation template for any verb can be defined. In one example, the general service operation template for 'create' verb can be applied to various entities across technologies to generate an implementation of the Service Operations associated with 'Create' verb. In one example, generalized template for 'Create' verb applicable to various entities for different technologies is listed below in Table 5. Same is applicable for other verbs correspondingly in other variety of technologies. The above described generalized service operation template can also be used for creating associations between different entities. Similarly, implementation for service operations associated with other verbs, for example 'Delete' and 'Set' Verb can also be generated by using above explained technique. Generalized pattern of Create, Update and Delete is applicable to various entities for different technologies as listed below in Table 5.

and DHCPD from FIG. 6. The implementation of service operation 'Create DHCPD' so generated is CreateDHCPD_SOP (DHCPDFileName, DHCPDFilePath, DHCPDinterface) shown in Table 6 below.

TABLE 6

CreateDHCPD_SOP (DHCPDFileName, DHCPDFilePath, DHCPDinterface)

| # | PREDICATE | ACTION |
|---|---|---|
| 1. | ((DHCPDFileName exists) && (DHCPDFilePath exists)) && (DHCPDinterface exists)) | ((var11_return, var11_output ) = CheckDHCP( ) |
| 2. | ((var11_return != 0)) | ( Eject ) |
| 3. | ((var11_return = 0)) | (var1_return, var1_output ) = CheckDHCPD(${DHCPDFileName } , ${ DHCPDFilePath } ) |
| 4. | ((var1_return = 0)) | ( Eject ) |
| 5. | ((var1_return != 0)) | (var2_return, var2_output ) = CreateDHCPD(${DHCPDFileName } , ${ DHCPDFilePath },${DHCPDinterface} ) |
| 6. | ((var2_return != 0)) | (Eject) |
| 7. | ((var2_return = 0)) | (var3_return, var3_output ) = CheckDHCPD(${DHCPDFileName } , ${ DHCPDFilePath }) |
| 8. | ((var3_return != 0)) | ( Eject ) |
| 9. | ((var3_return = 0)) | (var4_return, var4_output ) = RestartDHCP( ) |
| 10. | ((var4_return != 0)) | ( Eject ) |
| 11. | ((var4_return = 0)) | (Resolved) |

TABLE 5

Generalized pattern of create, update and delete applicable to various entities for different technologies

| S. no | Technology | Entities |
|---|---|---|
| 1. | OS | File, Partition, User, Group, and the like |
| 2. | Database | User, Table, and the like |
| 3. | Application | User, Role, and the like |

Figure 4:
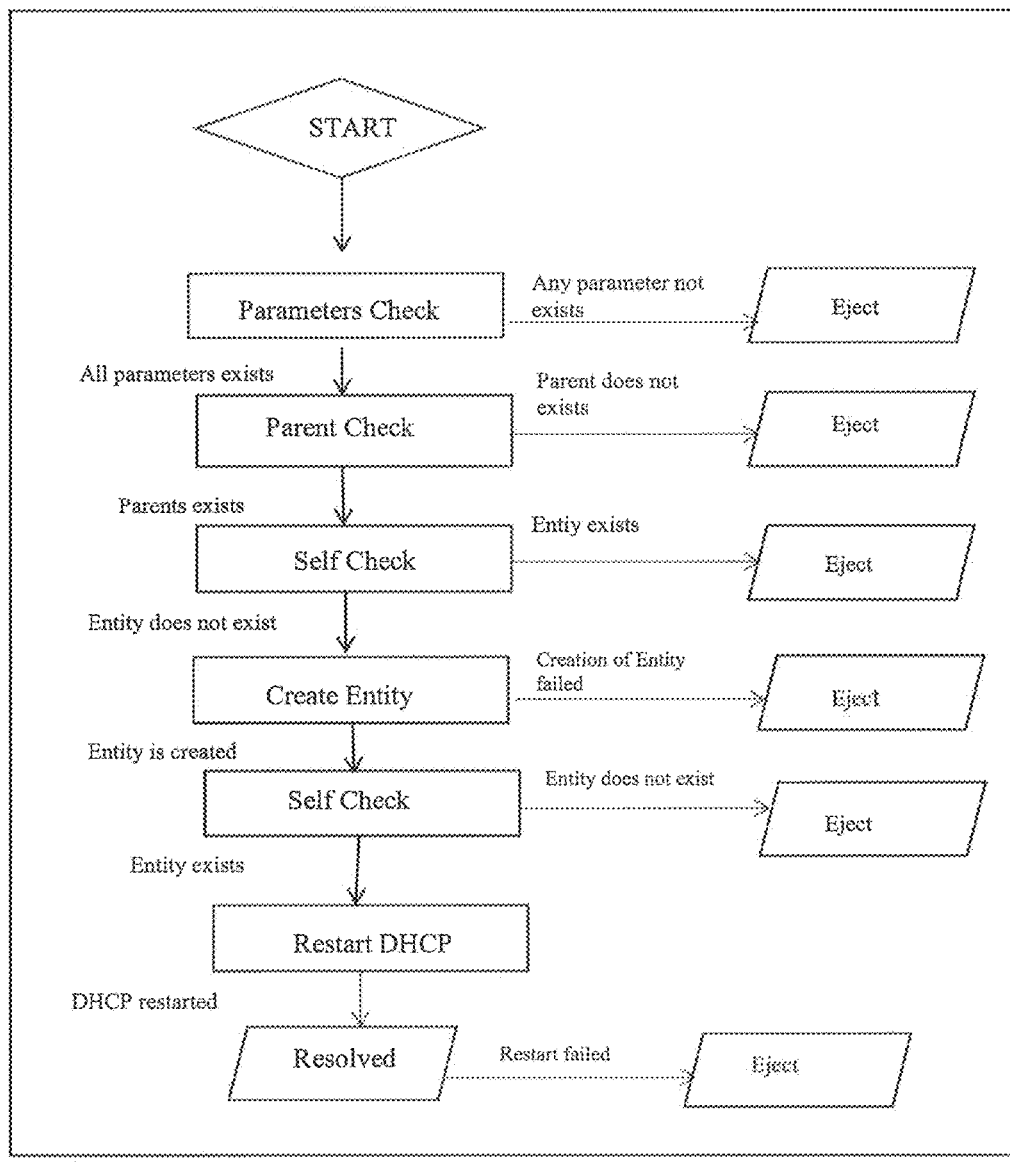
FIG. 4 illustrates a service operation template for create entity (create user) by representing a flow chart in accordance with some embodiments of the present disclosure.

According to another embodiment, the service operation template may also be applied at different levels such as a global level, a technology level and an entity level. Entity level template/pattern may have the highest priority, then technology level and then the global level template/pattern may have the least priority. For example: For Create verb, service operation template defined in FIG. 4 is used. But, if DHCP technology is to be used, then service operation template shown in FIG. 6 needs to be used. Hence, in some cases the service operation template must be defined at the resource level. Suppose a model with DHCP as a resource and DHCPD as sub-entity is present. As shown in FIG. 6, 'Create' verb is associated with DHCP and DHCPD both, but service operation template is associated with the DHCP 'Create' verb. The service operation 'Create DHCPD' is generated by using generalized service operation template shown in FIG. 4 and association of create verb with DHCP In another embodiment, if any entity has an associated service operation template with any associated verb then that service operation template is used for generating service operation implementation. If the associated service operation template is not present, then the system searches for another service operation template at technology level. If at technology level also, no associated service operation template is defined, then the system can go for the service operation template defined globally for that verb. For example, in a Global level Verb-service operation template map for create verb, the service operation template is Create template; at technology level (DHCP) Verb-service operation template Map, for DHCP, Create template is 'Create.DHCP' template, and at Entity level (Specific Entity) Verb-template Map, for any specific entity, Create service operation template is 'Create.Entity' template. So, while generating the service operation, for each entity, first entity level associated service operation template is checked, if there is some service operation template defined at the entity level, then that service operation template is mapped with the entity. If no service operation template is defined at the entity level, then the service operation template at technology level is looked up. If again no service operation template at technology level is present for specific verb, then a global level service operation template is mapped with the entity to generate implementation for corresponding service operation.

Still, in another embodiment, the service operation template may also be defined for associations between the entities from Entity Relationship Model. For example, User is associated to Group with association "BelongsTo". "BelongsTo" association has "Create" Verb associated with it. Hence the service operation template corresponding to "Create" Verb with "BelongsTo" association may also be defined. Applying the generalized service operation template above to the association depicted results for implementation generation shown in the Table 7 for CreateUserBelongsToGroup_SOP (UserName, GroupName, OSHostname).

TABLE 7

CreateUserBelongsToGroup_SOP (UserName, GroupName, OSHostname)

| # | PREDICATE | ACTION |
|---|---|---|
| 1. | ((UserName exists) && (GroupName exists) && (OSHostname exists)) | (var11_return, var11_output ) = CheckOS(${OSHostname}) |
| 2. | ((var11_return != 0)) | ( Eject ) |
| 3. | ((var11_return = 0)) | (var11_return, var11_output ) = CheckUser(${UserName}) |
| 4. | (var11_return != 0)) | ( Eject ) |
| 5. | (var11_return = 0)) | (var11_return, var11_output ) = CheckGroup(${GroupName}) |
| 6. | ((var11_return != 0)) | ( Eject ) |
| 7. | ((var11_return = 0)) | (var1_return, var1_output ) = CheckUserBelongsToGroup(${UserName}, ${ GroupName }) |
| 8. | ((var1_return = 0)) | ( Eject ) |
| 9. | ((var1_return != 0)) | (var2_return, var2_output ) = CreateUserBelongsToGroup(${UserName}, ${GroupName }) |
| 10. | ((var2_return != 0)) | ( Eject ) |
| 11. | ((var2_return = 0)) | (var3_return, var3_output ) = CheckUserBelongsToGroup(${UserName}, ${ GroupName }) |
| 12. | ((var3_return != 0)) | ( Eject ) |
| 13. | ((var3_return = 0)) | ( Resolved ) |

Figure 7:
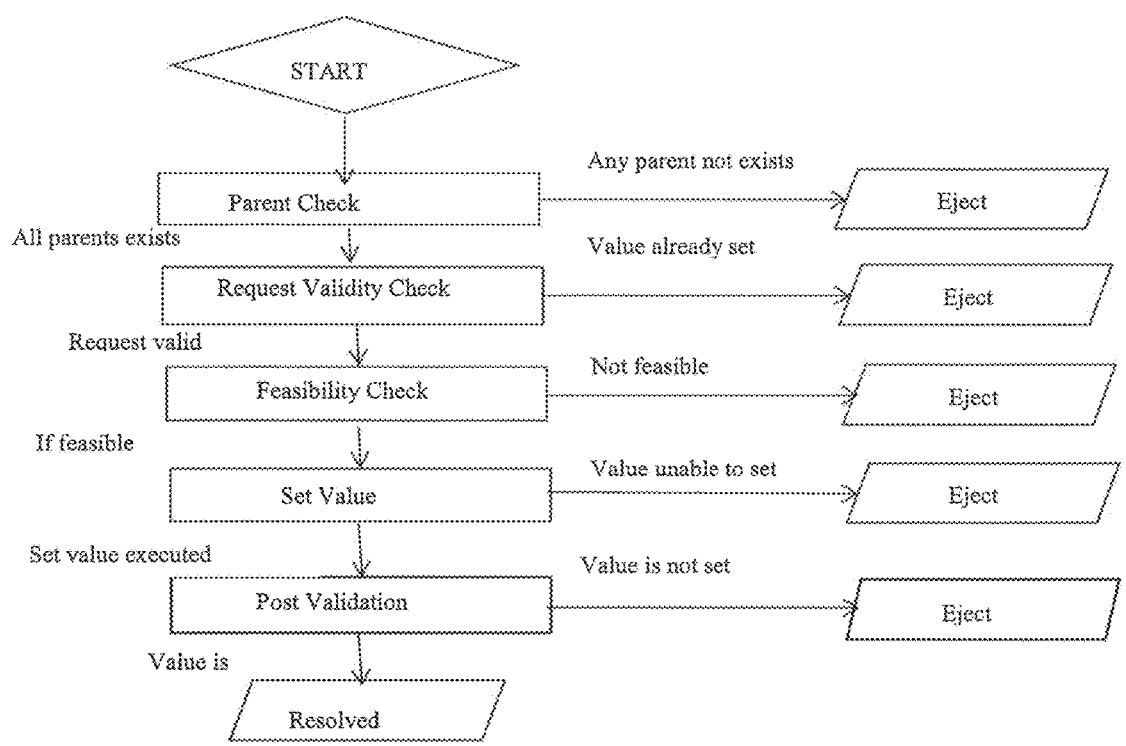
FIG. 7 illustrates a service operation template for Set verb is represented by a flow chart in accordance with some embodiments of the present disclosure.

Many service operation templates for generating implementations of the service operations share same structure. For instance the service operation template for the verbs Get, Encrypt, Update and so on adhere to a common structure. Service operation template for Set verb is shown in FIG. 7. FIG. 7 illustrates the service operation template for 'Set verb' represented by a flow chart. The formation of template of service operation templates provides further abstraction of service operation templates and standardizations. A generalized service operation template for a plurality of verbs is shown in FIG. 5. Referring to FIG. 5, a main verb in the figure refers to calling of the verb for which the generalized service operation template is getting applied. For instance if the generalized service operation template is applied to the verb 'Encrypt' then the main verb block is replaced by a call to the Encrypt verb.

Referring to FIG. 5, service operation template can be generalized to form a service operation template of plurality of service operation templates shown below. Thus the service operation template of the plurality of service operation templates provides for further abstraction of service operation templates and standardizations. Generalized Pattern for the plurality of verbs associated with different tasks is shown in FIG. 5. The service operation template contains a logical flow of steps/conditions to achieve a verb specific task. In one example, the service operation templates are coded in Java™. The service operation templates can also be coded in similar technologies known to a person skilled in the art.

In another embodiment of the present disclosure, after identifying the part of the Entity Relationship Model matching with the task, the pre-processing module 210 further dynamically identifies a part of an Entity relationship instance model associated with the task based on the part of the Entity Relationship Model matching with the task and the task information. The Entity relationship instance model is an instance of the ER Model. The Entity relationship instance model contains description about instance data of entities, attributes and relationships between the entities and attributes as depicted in the ER model. The ER model has entity types and attributes and the ER instance model has specific entities and specific values of the attributes, matching with task. ER model and ER instance models are pre-stored models in the system 102.

Figure 8:
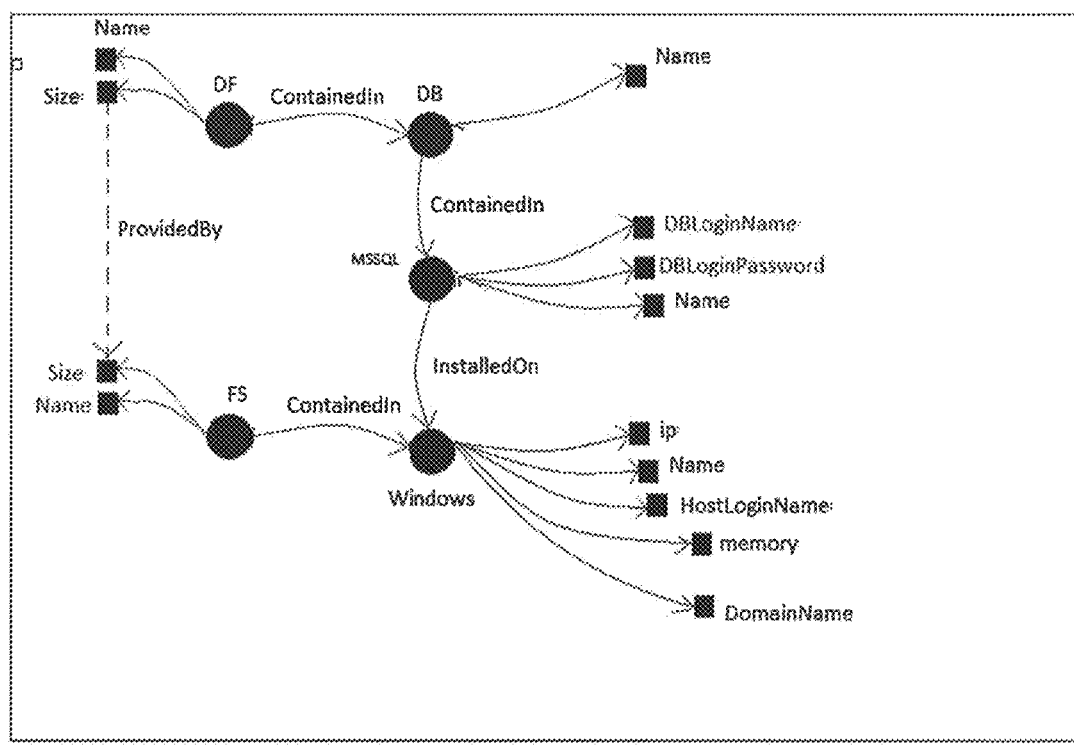
FIG. 8 illustrates an entity relationship model for 'set DF size' task in accordance with some exemplary embodiments of the present disclosure.
Figure 9:
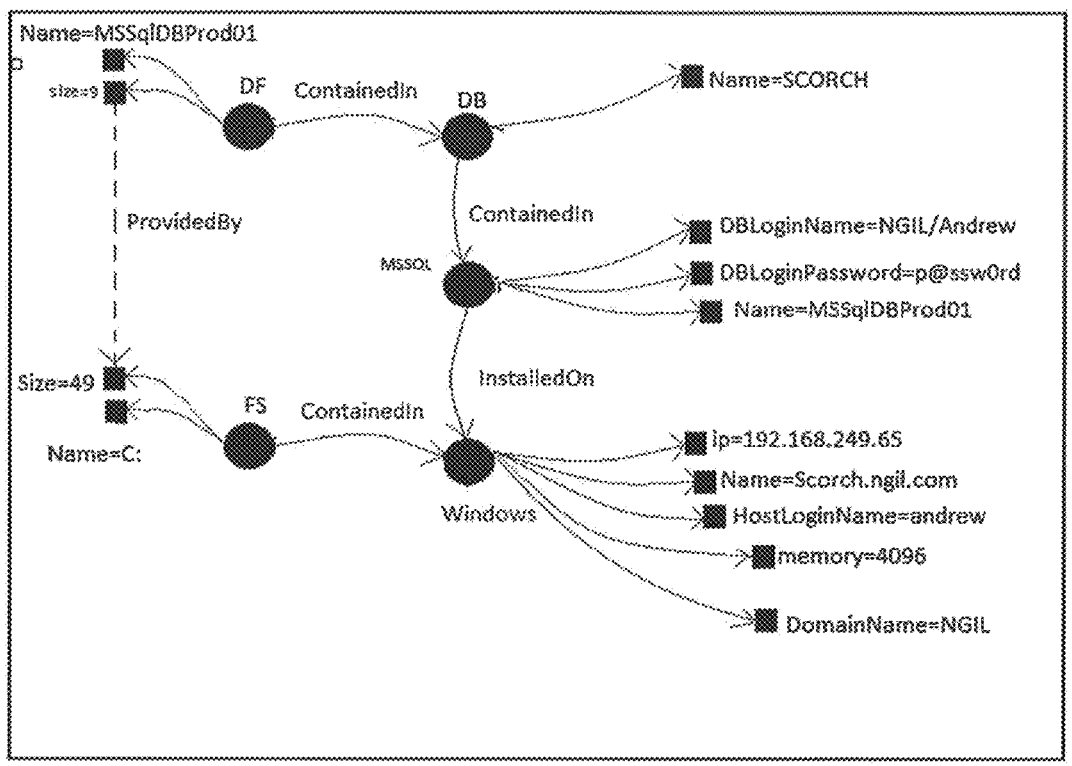
FIG. 9 illustrates an entity relationship instance model for 'set DF size' task in accordance with some exemplary embodiments of the present disclosure.

FIG. 8 illustrates an ER Model for 'set DF size' task in accordance with an exemplary embodiment, and FIG. 9 is an ER Instance Model for 'set DF size' task corresponding to the ER model of FIG. 8. Referring to FIG. 8, in the ER Model, black colored circles represents Entities and black colored square boxes represents attributes. There are 5 entities namely DF, DB, MSSQL, Windows and FS. Each entity has its attributes, for instance, DF has 'name' and 'size' as attributes. The entities are connected to other entities through associations. The associations defined in the ER model are DF is ContainedIn DB, DB is ContainedIn MSSQL, MSSQL is InstalledOn Windows, FS ContainedIn Windows. There can be associations between the attributes as well. For example attribute Size of entity DF is associated to attribute Size of entity FS through 'ProvidedBy' association, which is represented by the dotted arrow as shown in FIG. 8.

Referring to FIG. 9, the ER Instance Model contains specific values of the attributes of the ER Model. For example, Entity 'DF' has two attributes with name as MSSqlDBProd01 and with size 9, as shown in FIG. 9. In one example, ER Instance Model are coded in Json™. ER Instance Model can also be coded in xml or similar technologies known to a person skilled in the art.

After identifying the part of the Entity relationship instance model, the pre-processing module 210 dynamically identifies a service operation template associated with the task based on the task information. After identifying the part of the ER instance model and the service operation template, the implementation generator 212 dynamically processes the part of the Entity relationship instance model and the service operation template so identified to generate a service operation template implementation for executing the task. In one embodiment, the part of the ER instance model so identified is a branch of the ER instance model matching with the task.

Sometimes the information received from the given parameters is not sufficient to execute the task, and few other details are also required. For example, in the case of SetOSMemory the parameters that are received are OS Details (OSHostname) and newMemorySize. But in practicality, some other details are also required such as VM Details on which the OS is installed, VCentre details on which VM is created and OS Details on which VCentre is installed to carry out the task. The service operation implementation makes call to the additional entities (VM, Vcentre, OS) for performing the task. Such data about the needed entities is fetched from the Entity Relationship instance model.

The implementation generator 212 dynamically generates step wise implementation for the service operation. More particularly, the implementation generator 212 dynamically generates step wise implementation for one or more sub-steps of the service operation, and simultaneously executes the implementation for the one or more sub-steps for executing the service operation implementation. The dynamic generation and execution of the implementation for the one or more sub-steps of the service operation depends on one or more pre-conditions mentioned in the corresponding service operation template. The execution of the one or more sub-steps of the service operation implementation depends on result of verification of the pre-condition. The implementation generator 212 generate and simultaneously execute the one or more sub-steps/sub-tasks based on the result of verification of the pre-condition as "true" or "false". Thus the system saves on generation and execution cycles for the implementation of the service operation sub-steps/sub-tasks when it is not required or when the output of pre-condition verification is false/true, based on the logic mentioned in the service operation template.

TABLE 8

Parent check executed for dependent parents as mentioned in Service Operation Template

| ATTRIBUTE | PARENTS | STANDARD OPERATORS |
|---|---|---|
| Size | Windows, FS,MSSQL, DB,DF | 1. CheckWindows( scorch.ngil.com) <br> 2. CheckFS( NGIL,andrew,scorch.ngil,com,C:) <br> 3. CheckMSSQL( scorch.ngil.com,NGIL\andrew,p@ssw0rd,SCORCH) <br> 4. CheckDB( scorch.ngil.com,NGIL\andrew,p@ssw0rd,SCORCH,MSSqIDBProd01) <br> 5.CheckDF( scorch.ngil.com,NGIL\andrew,p@ssw0rd,SCORCH,MSSqIDBProd01, MSSqIDBProd01) |

In one implementation, referring to FIG. 9, 'Set' verb is applied on 'Size' attribute of DF entity. DF is Data File. Thus the service operation template for "Set" verb that is for task 'set memory size' is explained below. In the first step of the service operation template for "set" verb is applied on "size" attribute of DF entity, Parent Check is performed as shown in Table 8. Parent check looks for all dependent parents of attribute "size" with the associations 'ProvidedBy', 'ContainedIn' and 'InstalledOn' and ensures the availability of the dependent parents. If any of parents is not available, then the service operation 'set memory size' is ejected.

The second step 'Request Validity Check' of the service operation template is explained below. The step of Request Validity check makes sure that the attribute value which is to be set is not already set. In SetDFSize, for example, 11 mb is the requested size to set. The Request Validity check step, finds out an actual size of DF by calling standard operator 'getDFSize' then compares whether the actual size and requested size is same or different. If size are same then eject is executed. The execution of Request Validity check step of the service operation template 'set memory size' is shown in Table 9.

TABLE 9

Request Validity check of Service Operation Template

| FUNCTION CALL | TYPE |
|---|---|
| 0,10 = getDFSize(scorch.ngil.com,NGIL\andrew,p@ssw0rd, SCORCH,MSSqIDBProd01,MSSqIDBProd01) | Standard Operator |
| compareValidity(10,11) | Computation |

Third step of the service operation template 'set memory size' is to perform Feasibility Check. The step of Feasibility Check ensures if service operation is feasible to perform with the given parameters. To set any attribute value, first process checks if the attribute being set is dependent on other entity's attribute, this can be achieved using providedBy association between attributes. If so, then check the feasibility of dependent attribute. In SetDFSize operation, DFSize attribute is providedBy FSSize attribute. Hence feasibility of 'FS Size' is to be checked.

Fourth step of the service operation template for 'set memory size', the step of set value is explained. When all the previous steps are successfully executed, then a standard operator is called to set the attribute value.

TABLE 9

Set DF size step of service operation template

| ACTION | SetDFSize(scorch.ngil.com,NGIL\andrew,p@ssw0rd, SCORCH,MASSqIDBProd01,MSSqIDBProd01,11) |
|---|---|

In next step of service operation 'set memory size', Post validation process ensures if action of setting attribute value is successfully performed. If post validation fails, the service operation 'set memory size' is ejected. For example, for SetDFSize, postCheck retrieves current size of DFSize and compares with requested size. If both are equal then operation is completed successfully. The step of Post validation is explained in table 10 below.

TABLE 10

Post Validation step of service operation template

| FUNCTION CALL | TYPE |
|---|---|
| getDFSize(scorch.ngil.com,NGIL\andrew,p@ssw0rd, SCORCH,MSSqlDBProd01,MSSqlDBProd01) | Standard Operator |

After processing the service operation template for 'set memory size' and the matching part of the ER instance model of FIG. 9, as explained above the implementation of the service operation "set DF size" is generated as shown in Table 11.

TABLE 11

Service Operation implantation generated for service operation "set DF size"

| Return Values | Function Calls |
|---|---|
| 0,True | CheckWindows(scorch.ngil.com) |
| 0,output | CheckFS(NGIL,andrew,scorch.ngil.com,C:) |
| 0,SCORCH | CheckMSSQL(scorch.ngil.com,NGIL\andrew,p@ssw0rd,SCORCH) |
| 0,MSSqlDBProd | CheckDB(scorch.ngil.com,NGIL\andrew,p@ssw0rd,SCORCH,MSSqlDB01Prod01) |
| 0,MSSqlDBProd01 | CheckDF(scorch,ngil.com,NGIL\andrew,p@ssw0rd,SCORCH,MSSqlDBProd01, MSSqlDBProd01) |
| 0,10 | getDFSize(scorch.ngil.com,NGIL\andrew,p@ssw0rd,SCORCH,MSSqlDBProd01, MSSqlDBProd01) |
| 0 | compareValidity(10,11) |
| 0,10 | getDFSize(scorch.ngil.com,NGIL\andrew,p@ssw0rd,SCORCH,MSSqlDBProd01, MSSqlDBProd01) |
| 1 | GetDelta(11,10) |
| 0,788.41015625 | getFSFreeSize(NGIL,andrew,scorch.ngil.com,C:) |
| 0 | Compare(788.41015625,1) |
| 0,SUCCESS | SetDFSize(scorch.ngil.com,NGIL\andrew,p@ssw0rd,SCORCH,MSSqlDBProd01, MSSqlDBProd01,11) |
| 0,11 | getDFSize(scorch.ngil.com,NGIL\andrew,p@ssw0rd,SCORCH,MSSqlDBProd01, MSSqlDBProd01) |

WORKING EXAMPLES

Example 1

Figure 10:
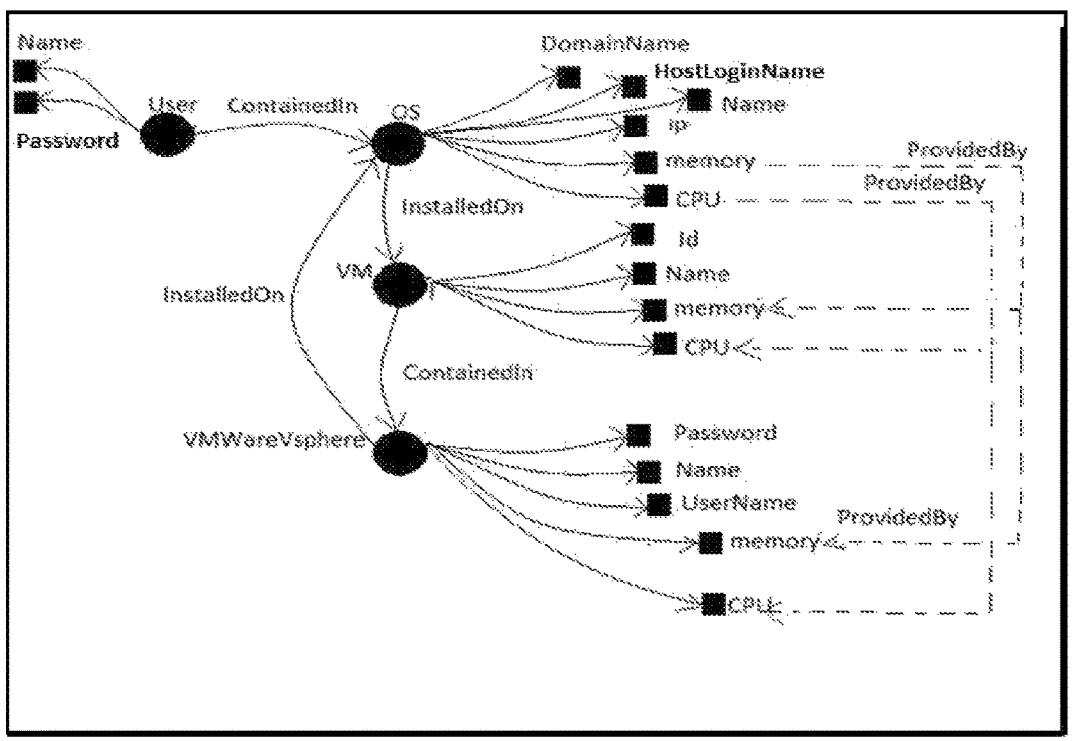
FIG. 10 illustrates an entity relationship model for 'Create User' task in accordance with some exemplary embodiments of the present disclosure.
Figure 11:
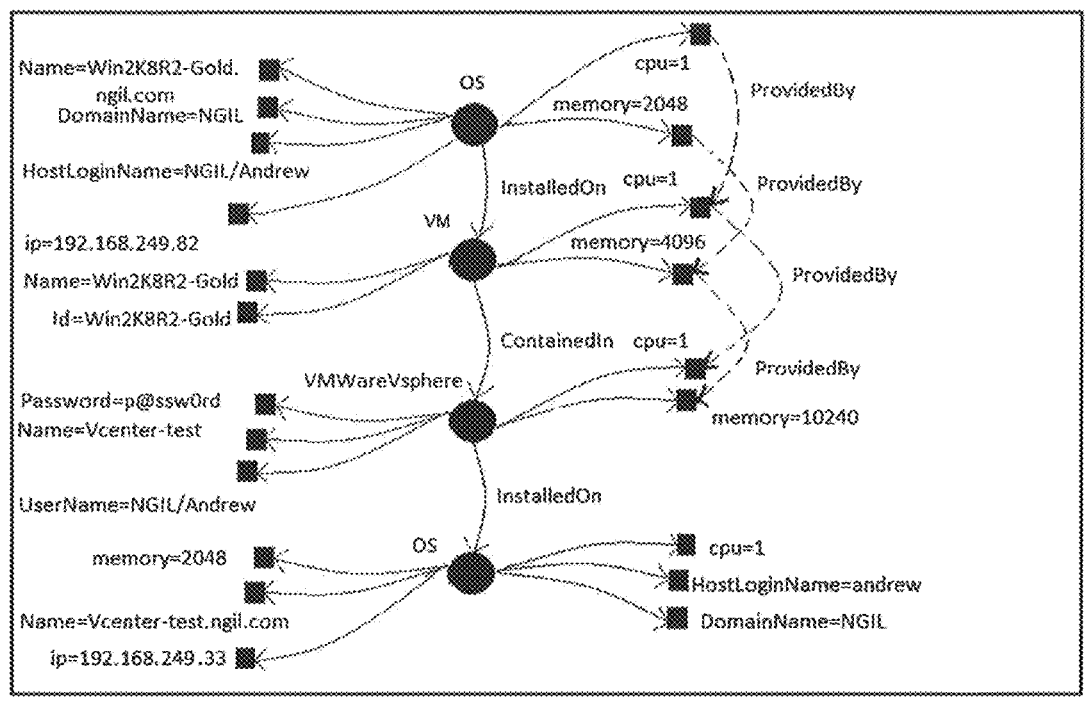
FIG. 11 illustrates an entity relationship instance model for 'Create User' task in accordance with some exemplary embodiments of the present disclosure.

Referring to FIGS. 10 and 11, Service Operation template for Create Verb is explained. By way of an example for "create user" task, wherein 'Create is verb' and 'User is entity' viz. to create a service operation implementation for "Create User", the system 102 receives an ER model, an ER instance model and Task Information. The ER model may also be termed as "MetaModel" or "Infra Model". Task Information comprises: Task Name as "Create User", Task Parameters as OS_Name, OS_DomainName, OS_HostLoginName, User_Name, User_Password, Task Summary as 'Create User' and Key Element as 'User'. The service operation template for Create Verb comprises following steps: i) Validity Check-1.1 Parent Check and 1.2 Self Check, ii) Feasibility Check iii) Action and iv) PostCheck.

FIG. 10 shows the ER model (Meta Model) for 'Create User' and FIG. 11 shows 'ER instance model' for Task 'Create User'. The step by step processing flow of service operation template, ER model and the ER instance model is explained. The pre-processing module receives 'Key Element' from the task Information and searches for 'Key Element' in the ER Model. Based on the search, the pre-processing module retrieves matching branch of the ER model shown in FIG. 10 based on the task information and using predefined associations in Verb from the ER model. For example User is Key Element and associations are 'ContainedIn', 'InstalledOn' which gives matching branch of the ER model as shown below.

User- ContainedIn-OS- InstalledOn-VM-ContainedIn-VMwareVSphere-InstalledOn-OS.

Further using the branch information of the ER model as retrieved above, matching branch of ER instance model is retrieved by the pre-processing module 210, as depicted in FIG. 11. For example matching Branch of ER Instance model in present example is shown below:

OS(Win2K8-Gold.ngil.com)- InstalledOn-VM(Win2K8R2-Gold)-ContainedIn-

VMwareVSphere(vcenter-test)- InstalledOn-OS(vcenter-test.ngil.com)

Based on the branch information retrieved from the ER Instance model, parent check on every element of matching branch of the ER instance model is performed by the Implementation generator. For example, CheckOS, CheckVM, CheckVmwareVSphere, CheckOS calls are generated to check availability of all the elements of the matching branch of the ER instance model. Further, self-check is performed on Key Element that is CheckUser applied on User Entity, then given Task is performed on the key Element by the Implementation generator. For example: Create user is applied on given OS, that is new user is created for given OS. Further, postcheck step is performed to ensure the task of 'Create User' has been completed successfully.

Example 2

Figure 12:
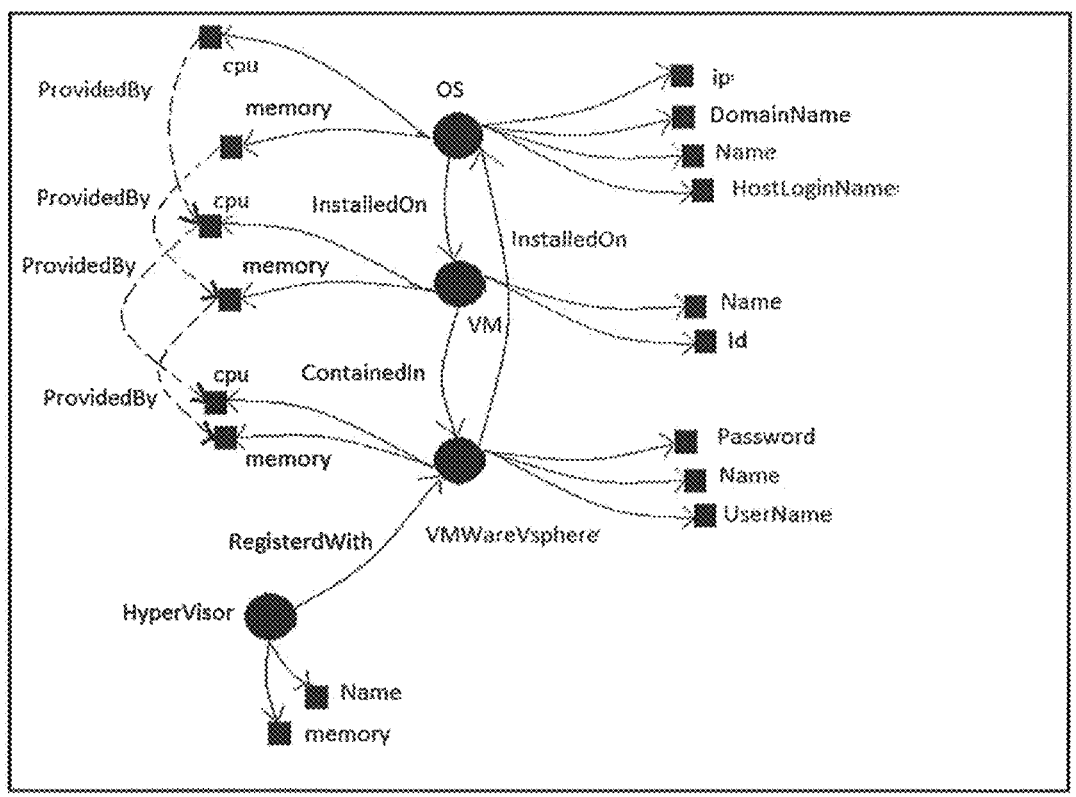
FIG. 12 illustrates an entity relationship model for 'set OS memory' task in accordance with some embodiments of the present disclosure.
Figure 13:
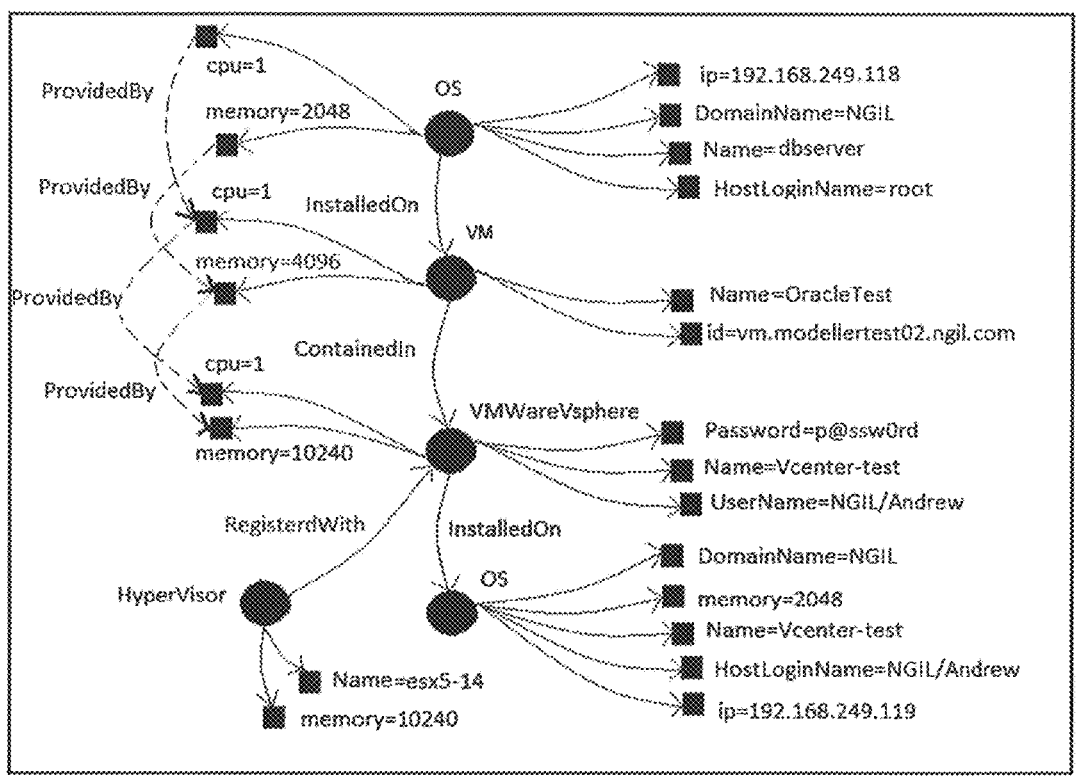
FIG. 13 illustrates an entity relationship instance model for 'set OS memory' task in accordance with an exemplary embodiment of the present disclosure.

Referring to FIGS. 12 and 13, Service operation implementation generation for 'Set verb'. The service operation template applied in this Example 2 comprises following steps: 1) Validity Check-1.1 Parent Check and 1.2 Self Check 2) Feasibility Check 3) Action and 4) PostCheck. An exemplary task for set verb such as 'Set OS memory' is explained below. The input received contains task associated ER Model (Infra Model), an ER Instance model, and Task Information. The Task Information comprises Task Name: setOSMemory and Task Parameters: OS_DomainName, OS_HostLoginName, OS_Name, Vcenter_Name, Vcenter_UserName, Vcenter_Password, VM_Name, Newmemory; Task Summary: 'Set operating system's memory' and Key Element: 'OS.memory'.

The execution flow of the service operation template for Set verb is explained below. In first step, the pre-processing module receives Key Element from task Information and searches for the key element in ER Model. Based on the Key element search, the pre-processing module retrieves matching ER model branch, needed for execution of the task, using predefined associations in Verb. For example here OS.memory is KeyElement which is attribute, and associations are ContainedIn, InstalledOn, ProvidedBy which gives ER model branch as shown below:

OS- InstalledOn-VM- ContainedIn-VMwareVSphere-InstalledOn-OS

Based on the above shown ER model branch and the task information, ER instance model branch is retrieved as shown below:

OS(dbServer)-InstalledOn-VM(OraclsTest)-Contained In-
VMwareVSphere(vcenter-test)- InstalledOn-OS(vcenter-test)

Further in next step, Implementation Generator 212 Checks if KeyAttribute is controllable by its parent entity itself. Every attribute holds a property called IsControllable whose value can be either true or false. If true, the parent entity is able to modify the attribute's value. If false, parent cannot modify the attribute's value, the attribute should be provided by some other attribute and task is delegated to the providing attribute's parent. For example. For Set memory task, the attribute memory's IsControllable property is false, that is OS is not able to modify the memory and memory is provided by another attribute named Memory of VM entity. Therefore, the service operation 'Set verb' is out task on VM.memory and steps 1 and 2 are repeated for new key Element VM.Memory.

Further, the Implementation generator 212 performs parent check on every element of matching branch of the ER instance model. For example CheckVmwareVSphere, CheckOS calls are generated to check availability of required components. Further, 'self-check' is performed on the Key Element. For example, CheckVM is applied on VM Entity.

To verify the feasibility of task Set verb, the Implementation generator 212 searches for whether attribute is providedBy some other attribute, which defines the dependency of attribute on providing attribute. If so, then the Implementation generator checks feasibility of providing attribute. For example, here VM.memory is provided By VmwareVSphere.memory, so the process need to be followed as: 1. Call GetVMMemory, 2. Calculate Delta—difference between memory to set and existing memory, 3. Call get-VMwareVSphereFreememory, 4. Check if Delta is less than or equal to VmwareVSphereFreememory. If less then feasibility is ensured. Further, the Implementation generator performs the set Task on key Element. For example, Set memory on VM is performed in this example. Further, the implementation generator performs post check to ensure the task of 'Set OS memory' is completed successfully.

The system and method for automatically generating and executing a service operation implementation for executing a task as disclosed in the present disclosure provides a plurality of advantages as described below:

The system and method enable dynamic generation and execution a service operation implementation for executing a task.

The service operation implementation so generated is consistent, complete and has improved accuracy.

The service operation implementation so generated is error free and compatible with variety of resources and tools.

Further, the service operation implementation is generated dynamically based on the service operation template and a matching part of the ER model or matching part of the ER instance model, hence there is no need to store the service operation or the service operation implementation, hence saves on required memory space.

Further, the service operation implementation is generated in real time and hence there is no need of validation of the service operation implementation, hence saves on usage of system cycles and human efforts.

Figure 14:
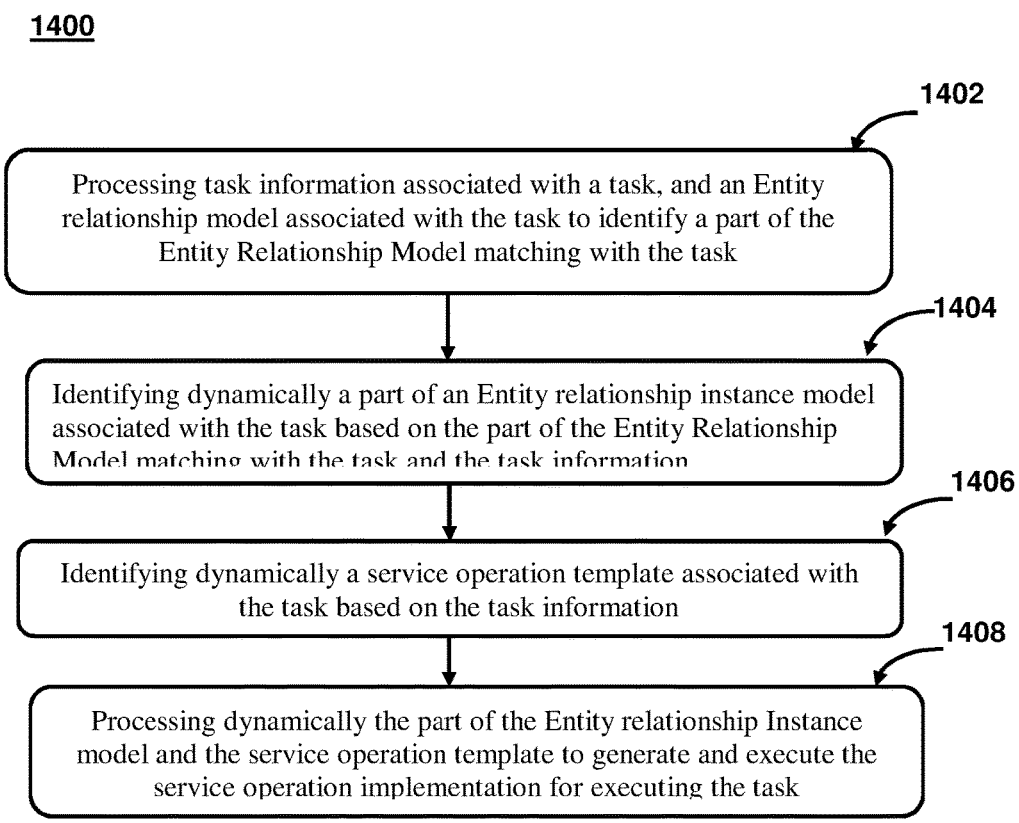
FIG. 14, illustrates a method for automatically generating and executing the service operation implementation for executing a task, in accordance with an embodiment of the present subject matter.

Referring now to FIG. 14, a method 1400 for automatically generating and executing a service operation implementation for executing a task is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 1400 may also be practiced in a distributed computing environment where functions are performed by remote processing devices that are linked through a communications network. In a distributed computing environment, computer executable instructions may be located in both local and remote computer storage media, including memory storage devices.

The order in which the method 1400 is described is not intended to be construed as a limitation, and any number of the described method blocks can be combined in any order to implement the method 1400 or alternate methods. Additionally, individual blocks may be deleted from the method 1400 without departing from the spirit and scope of the subject matter described herein. Furthermore, the method can be implemented in any suitable hardware, software, firmware, or combination thereof. However, for ease of explanation, in the embodiments described below, the method 1400 may be considered to be implemented in the above described system 102.

At block 1402, task information associated with a task, and an Entity relationship model associated with the task is processed to identify a part of the Entity Relationship Model matching with the task. In one embodiment, the task information associated with the task, and the Entity relationship model associated with the task is processed by the pre-processing module 210 to identify the part of the Entity Relationship Model matching with the task.

At block 1404, a part of an Entity relationship instance model associated with the task is identified dynamically, based on the part of the Entity Relationship Model matching with the task and the task information. In one embodiment, the part of an Entity relationship instance model associated with the task is identified dynamically, by the pre-processing module 210 based on the part of the Entity Relationship Model matching with the task and the task information.

At block 1406, a service operation template associated with the task is identified dynamically based on the task information. In one embodiment, the service operation template associated with the task is identified dynamically by the pre-processing module 210 based on the task information.

At block 1408, the part of the Entity relationship Instance model and the service operation template is processed dynamically to generate and execute the service operation implementation for executing the task. In one embodiment, the part of the Entity relationship Instance model and the service operation template is processed dynamically by the implementation generator 212 to generate and execute the service operation implementation for executing the task.

The method 1400 further comprises dynamically generating implementation for the one or more sub-steps of the service operation, and simultaneously executing the implementation for the one or more sub-steps for executing the one or more sub-steps of the service operation. The dynamic generation and execution of the implementation for the one or more sub-steps of the service operation depends on one or more pre-conditions mentioned in the service operation template. The task information comprises a type of task, a name of the task, summary of the task, parameters to execute the task, and key element associated with the task, wherein the key element is an entity or an attribute or an association between entities or between attributes in the Entity Relationship Model. The task is a computer implemented task for providing a computer implemented service. The service operation template comprises of a technique for executing actions and verifying conditions necessary to perform the task. The service operation comprises one or more sub-steps of the task or one or more sub-tasks of the task. The method 1400 further comprises dynamically generating implementation for the one or more sub-steps of the service operation, and simultaneously executing the implementation for the one or more sub-steps for executing the one or more sub-steps of the service operation.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automatically generating and executing a service operation implementation for executing a task, the method comprising:
   processing, by a hardware processor, task information associated with a task, and an Entity relationship model associated with the task to identify a part of the Entity Relationship Model matching with the task;
   identifying dynamically, by the hardware processor, a part of an Entity Relationship Instance Model associated with the task based on the part of the Entity Relationship Model matching with the task and the task information, wherein the Entity Relationship Instance Model comprises description related to instance data of entities, attributes and relationships between the entities and attributes depicted in the Entity Relationship Model and matching with the task;
   identifying dynamically, by the hardware processor, a service operation template associated with the task based on the task information, wherein the service operation template comprises one or more pre-conditions, at least one of one or more sub-steps of the task and one or more sub-tasks, and one or more search criteria associated with at least one of the one or more sub-steps of the task and the one or more sub-tasks; and
   processing dynamically, by the hardware processor, at least one of the part of the Entity relationship model and the part of the Entity Relationship Instance Model, one or more parameters associated with the task, and the service operation template to simultaneously generate and execute a service operation implementation for at least one of the one or more sub-steps of the task and the one or more sub-tasks, for executing the task associated with the service operation, wherein the simultaneous generation and execution of the one or more sub-steps and the one or more sub-tasks is based on verification of the one or more pre-conditions.

2. The method of claim 1, wherein the service operation further comprises one or more service operations, and wherein the one or more service operations further comprises one or more tasks.

3. The method of claim 1, wherein the Entity relationship model is based on at least one technology, or at least one resource, or at least one software application.

4. The method of claim 1, wherein the Entity relationship instance model is based on at least one technology instance, or at least one resource instance, or at least one software application instance.

5. The method of claim 1, wherein the task information comprises a type of task, a name of the task, summary of the task, the one or more parameters to execute the task, and key element associated with the task, wherein the key element is an entity or an attribute or an association between entities or between attributes in the Entity Relationship Model.

6. The method of claim 1, wherein the task is a computer implemented task for providing a computer implemented service.

7. The method of claim 1, wherein the service operation template comprises of a technique for executing actions and verifying conditions necessary to perform the task.

8. A system for automatically generating and executing a service operation implementation for executing a task, the system comprising:

a hardware processor; and a memory coupled to the hardware processor, wherein the hardware processor executes a plurality of modules stored in the memory, and wherein the plurality of modules comprises:

a pre-processing module to, process dynamically task information associated with a task, and an Entity relationship model associated with the task to identify a part of the Entity Relationship Model matching with the task;

identify dynamically, a part of an Entity Relationship Instance Model associated with the task based on the part of the Entity Relationship Model matching with the task and the task information, wherein the Entity Relationship Instance Model comprises description related to instance data of entities, attributes and relationships between the entities and attributes depicted in the Entity Relationship Model and matching with the task; and identify a corresponding service operation template associated with the task based on the task information, wherein the service operation template comprises one or more pre-conditions, at least one of one or more sub-steps of the task and one or more sub-tasks, and one or more search criteria associated with at least one of the one or more sub-steps of the task and the one or more sub-tasks; and an implementation generator to process dynamically at least one of the part of the Entity relationship model and the part of the Entity Relationship Instance Model, one or more parameters associated with the task, and the service operation template to simultaneously generate and execute a service operation implementation for at least one of the one or more sub-steps of the task and the one or more sub-tasks, for executing the task associated with the service operation, wherein the simultaneous generation and execution of the one or more sub-steps and the one or more sub-tasks is based on verification of the one or more pre-conditions.

9. The system of claim 8, wherein the task is a computer implemented task for providing a computer implemented service.

10. The system of claim 8, wherein the service operation template comprises a technique for executing actions and verifying conditions necessary to perform the task.

11. The system of claim 8, wherein the task information comprises a type of task, a name of the task, summary of the task, parameters to execute the task, and key element associated with the task, wherein the key element is an entity or an attribute or an association between entities or between attributes in the Entity Relationship Model.

12. A non-transitory computer readable medium embodying a program executable in a computing device by a hardware processor for automatically generating and executing a service operation implementation for executing a task, the program comprising:

a program code for, processing dynamically, task information associated with a task, and an Entity relationship model associated with the task to Identify a part of the Entity Relationship Model matching with the task;

a program code for, identifying dynamically, a part of an Entity Relationship Instance Model associated with the task based on the part of the Entity Relationship Model matching with the task and the task information, wherein the Entity Relationship Instance Model comprises description related to instance data of entities, attributes and relationships between the entities and attributes depicted in the Entity Relationship Model and matching with the task;

a program code for, identifying dynamically, a corresponding service operation template associated with the task based on the task Information, wherein the service operation template comprises one or more pre-conditions, at least one of one or more sub-steps of the task and one or more sub-tasks, and one or more search criteria associated with at least one of the one or more sub-steps of the task and the one or more sub-tasks; and a program code for, processing dynamically, at least one of the part of the Entity relationship model and the part of the Entity Relationship Instance Model, one or more parameters associated with the task, and the corresponding service operation template to simultaneously generate and execute a service operation implementation for at least one of the one or more sub-steps of the task and the one or more sub-tasks, for executing the task associated with the service operation, wherein the simultaneous generation and execution of the one or more sub-steps and the one or more sub-tasks is based on verification of the one or more pre-conditions.

13. The non-transitory computer readable medium of claim 12, wherein the task is a computer implemented task for providing a computer implemented service.

\* \* \* \* \*